United States Patent Office 3,040,002
Patented June 19, 1962

3,040,002
ISOCYANATES

Clyde Lee Aldridge, Baton Rouge, La., assignor to Esso Research and Engineering Company, a corporation of Delaware
No Drawing. Filed June 27, 1957, Ser. No. 668,337
8 Claims. (Cl. 260—77.5)

This invention relates to new waterproofing agents and to textile fibers or goods treated therewith. More particularly it relates to monoadducts of long-chain hydroxylated hydrocarbons with aromatic diisocyanates and the use of these products as waterproofing agents for materials containing active hydrogens, especially cellulosic materials. Particularly effective embodiments of this invention relate to waterproofing agents derived by reaction of a hexadecyl alcohol or of hydroxy-methylated butyl rubber with tolylene diisocyanate or the like.

The invention is applicable to fabrics, fibers or materials that contain active hydrogens, especially cellulosic or polysaccharide-containing materials such as cotton fibers or fabrics, paper products, regenerated cellulose filaments or films made of viscose, cellulose acetate, or the like, substituted cellulose ester or ether filaments in which at least some of the hydroxyl groups of the cellulose remain unsubstituted, protein-containing textile materials such as wool and silk fibers, polyamide fibers such as nylon, and so forth.

It is broadly known that materials or fibers of the aforementioned types can be made waterproof by chemically attaching thereto a hydrophobic group, desirably in such a manner that the strength of the fibers is not impaired thereby. A wide variety of waterproofing materials has been previously proposed for this purpose, including a limited number of monoisocyanates. However, these materials were relatively expensive, usually of relatively low molecular weight and, due to the relatively complex synthesis required, they were available in only a limited number of types.

It has now been discovered that an unusually effective and economically attractive class of waterproofing agents can be made from relatively inexpensive diisocyanates in the form of monourethan type adducts of one mole of a $C_{10}$ and higher aliphatic, essentially monohydric alcohol or hydroxy hydrocarbon with one mole of the diisocyanate. This reaction can be represented by the following equation:

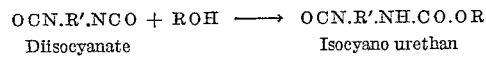

$$\text{OCN.R'.NCO} + \text{ROH} \longrightarrow \text{OCN.R'.NH.CO.OR}$$

Diisocyanate           Isocyano urethan wherein R is a long-chain aliphatic group consisting predominantly or essentially of carbon and hydrogen atoms and being of hydrophobic character.

A somewhat similar and highly effective agent can be prepared by using slightly hydroxylated butyl rubber instead of a simple aliphatic alcohol. Butyl rubber, as is well known, is a copolymer of about 1 to 10 weight percent of a $C_4$ to $C_5$ conjugated diolefin, preferably about 2% isoprene, and correspondingly 90 to 99 weight percent of isobutylene, prepared at temperatures below −40° C. in the presence of aluminum chloride or similar Friedel-Crafts catalyst in accordance with the procedure described in Patent No. 2,356,128. For purposes of this invention this rubbery copolymer is hydroxylated so as to contain about 0.1 to 1.0 wt. percent of hydroxyl groups, i.e. from 1 hydroxyl group per approximately 100 carbons to 1 hydroxyl group per approximately 1000 carbons. Preferably the hydroxyl groups are introduced by hydroxymethylating the polymer by the Prins reaction.

More unsaturated hydrocarbons such as natural rubber are undesirable for the present purposes, both because they tend to form undesirable gels during the Prins reaction and especially because the resulting products tend to degrade rather rapidly when exposed to air and light.

The Prins reaction is carried out in a manner otherwise well known in the art. For example, the butyl rubber to be hydroxymethylated is dissolved to a concentration of 5–25% (e.g. 10%) in an inert solvent such as a hydrocarbon or halogenated hydrocarbon, preferably chloroform. To this solution is added 1–10% (based on polymer) of an acid, preferably a Lewis type acid, e.g. 5% of boron trifluoride etherate, together with 1–10% (based on polymer), preferably about 5%, of paraformaldehyde, the reaction is allowed to proceed for 1–24 hours at a temperature of 0°–100° C., preferably about 10 hours at 20°–40° C. The product may be recovered as a solution by washing the reaction mixture with 1–10% aqueous sodium hydroxide solution followed by water. Or the solid polymer may be recovered by precipitation. Precipitation is accomplished by the addition to the polymer solution of 0.5–10 parts of a solvent in which the polymer is insoluble, e.g. the lower oxygenated compounds, preferably containing 1–4 carbon atoms and preferably being either an alcohol such as isopropanol or a ketone such as methyl ethyl ketone. If desired a combination of precipitation and washing may be used for product recovery.

In preparing the adducts, the hydroxy compound is reacted with at least an equimolar amount of a diisocyanate. However, at least a 20 mole percent excess of diisocyanate is preferred since this tends to favor the formation of the monoadduct (isocyano monourethan) and repress the formation of the unwanted diadduct (diurethan). At diisocyanate/hydroxyl compound mole ratios of about 1.3 or greater, the hydroxyl compound can be essentially completely converted to the monoadduct. Aromatic diisocyanates, and more especially tolylene 2,4-diisocyanate or a commercial mixture of tolylene diisocyanate isomers are particularly useful. However, other suitable diisocyanates include p-phenylene diisocyanates, xylylene diisocyanates, as well as aliphatic diisocyanates such as 1,6-hexamethylene diisocyanate. Generically these compounds may be described by the formula

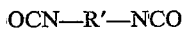

OCN—R'—NCO wherein R' is a divalent aliphatic, alicyclic or aromatic radical of about 6 to 12 carbon atoms. Aromatic diisocyanates wherein the isocyanate groups are in meta position with respect to each other, and aliphatic diisocyanates containing the isocyanate groups attached to the terminal carbon atoms of the hydrocarbon radical are particularly suitable.

The required adduct formation is carried out by dissolving the hydroxy compound in a suitable inert solvent containing no active hydrogen such as pentane, hexane, heptane, cyclohexane, benzene, toluene, and halogenated hydrocarbons. Concentrations of such solutions may range between about 1 to 40% of polymer, preferably 10–30%, i.e., the solutions are prepared in sufficiently fluid form to permit effective stirring and mixing. When the solution is mixed with the diisocyanate, the reaction proceeds spontaneously and fairly rapidly even at room temperature. Suitable reaction temperatures are in the range between about 0°–100° C., preferably 20°–80° C. The reaction is desirably carried out in an inert atmosphere, e.g., nitrogen, in order to avoid reaction of the isocyanate groups with oxygen or moisture. Yields equal or close to 100%, based on the hydroxy compound, can be obtained. The remaining excess unreacted isocyanate can be removed from the reaction mixture by distillation.

A wide variety of hydroxy compounds are useful in making the isocyanourethans of this invention. A particularly useful class consists of higher aliphatic monohydric alcohols containing from 10 to 30 or even as many as several hundred carbon atoms per molecule in the form of an uninterrupted straight or branched carbon chain, or the carbon chain may be interrupted by oxygen linkages at intervals of preferably not less than 10 carbon atoms. Examples of suitable alkanols include decanols, hexadecanols, eicosanols, tricontanols, etc. These can be prepared in various ways. For instance, carbonylation of olefins in the presence of a cobalt catalyst and hydrogenation of the resulting aldehyde as described in U.S. Patent 2,327,066 produces branched chain alcohols generally referred to as Oxo alcohols. The dimeric alcohols usually found in Oxo bottoms and containing an ether linkage can also be used. An example of such an alcohol is the dimeric alkoxy alcohol $C_{10}H_{21}OC_{11}H_{22}OH$, found in $C_{10}$ Oxo alcohol bottoms. Aldox type dimer alcohols resulting from aldol condensations in the Oxo process are similarly useful. Straight chain alcohols of suitable molecular weight can be prepared by the Ziegler process wherein an olefin such as ethylene or proylene is polymerized to the desired molecular weight in the presence of an aluminum alkyl catalyst such as aluminum triethyl to give the corresponding long chain aluminum alkyl and the latter is finally hydrolyzed to give the desired alcohol as described, for instance, in Belgian Patent 540,198. Other useful alcohols such as lauryl or stearyl alcohols can be obtained from natural products, e.g. from fats, or by polymerizing ethylene in an alcohol solution with the aid of a peroxide catalyst, etc.

Another important class of useful hydroxy compounds consists of suitably hydroxymethylated rubbery or resinous polymers of low unsaturation of 10 mole percent or less, such as butyl rubber, petroleum resins (e.g. those having a molecular weight of about 1000 and prepared from a steam cracked $C_5$–$C_7$ hydrocarbon stream according to U.S. Patent 2,734,046), polypropylene from Friedel-Crafts polymerization, styrene-diolefin copolymers such as those prepared by copolymerizing a small amount of butadiene-1,3 with styrene in aqueous emulsion in the presence of a peroxy catalyst, etc.

The alcohol adducts of this invention can be represented by the following formula:

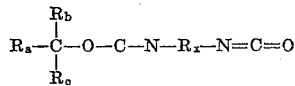

wherein:

$R_a$ is an aliphatic radical containing 9 to 200 or more carbon atoms either in the form of a straight or branched uninterrupted hydrocarbon chain or in the form of a plurality of oxygen-linked hydrocarbon chains of at least 9 carbon atoms each, $R_b$ and $R_c$ are alkyl radicals of 0 to 10 carbon atoms each, and $R_x$ is a divalent aliphatic or aromatic radical of 6 to 12 carbon atoms, e.g. 2,4-tolylene.

In the case of high molecular weight olefin-diene copolymers such as butyl rubber, a segment of the adducts based thereon can be pictured as follows:

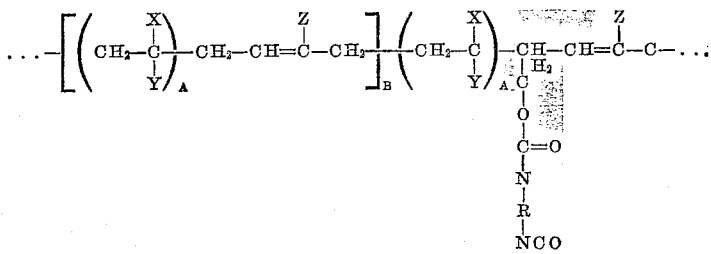

wherein:

R=divalent alkyl or aryl radical of 6 or more carbon atoms
X=H, $CH_3$, $C_2H_5$, $C_3H_7$, phenyl, etc.

Y=H, $CH_3$, $C_2H_5$, etc.
Z=H, $CH_3$, $C_2H_5$, etc.
A=1 to several hundred
B=1 to 100

For instance, when the waterproofing agent is prepared from butyl rubber containing 2 mole percent isoprene of which 10% has been hydroxymethylated and reacted with tolylene diisocyanate, X, Y, and Z in the above formula represent methyl groups, R represents tolylene, A may equal 49 and B may equal 9.

Characteristically, all the products of this invention contain at least one long aliphatic hydrophobic chain and, for all practical purposes, only one isocyanate group per molecule or large polymer segment. They are clearly distinct from previously known isocyanate derivatives which have molecules possessing relatively short hydrocarbon portions and many isocyanate groups per molecule, as described, for instance, in U.S. Patent 2,537,064. The latter agents not only require a rather complex synthesis but, due to the many isocyanate groups present per molecule, cause profuse cross-linking and consequently some stiffening of fibers when reacted therewith in sufficiently great proportion. They have accordingly been used for imparting crease resistance to fabrics, but have been relatively ineffective as waterproofing agents. By contrast, the hydrophobic monoisocyanate compounds of the present invention impart outstanding water resistance to fabrics even when used in very minute concentrations without, however, causing any significant cross-linking or immobilization of the treated fibers.

After completion of the adduct forming reaction, the resulting reaction mixture is usually too concentrated for direct use in impregnation. Consequently, it is desirably diluted with additional solvent to form a solution containing about 0.2 to 5%, preferably about 0.5 to 2% of the adduct. This solution is then used for treating the textile or other material to be waterproofed, e.g., by refluxing or merely by dipping to impregnate the material with the solution followed only by drying or baking in an oven. Depending on the boiling point of the refluxing solvent, the temperature of this treating step may be between about 30° to 150° C. It is desirable to treat the active-hydrogen containing fibers or films with sufficient treating solution and for a sufficient time to incorporate therein about 0.1 to 1.0 wt. percent, preferably 0.1 to 0.5 wt. percent, of the isocyano urethan adduct in the case of the alcohol adducts and 0.1 to 10 wt. percent, preferably 1 to 10 wt. percent in the case of the high molecular weight hydroxymethylated polymer adducts. Due to the high proportion of the hydrophobic part to the rest of the molecule in the case of the high molecular weight polymer adducts, a thicker layer thereof is generally combined with the material to be treated than when a relatively low molecular weight alcohol adduct is used.

In carrying out the impregnation it is convenient to have at least about 0.1 to 10 parts of adduct present and thus available for reaction in the treating solution per 100 parts of cellulosic or other material being treated. After completion of the treatment, the solution is drained off and the material dried, e.g., at 30° to 150° C. If desired, any unreacted diisocyanate and adduct which are deposited but not chemically bound to the material may be removed from the impregnated material by extraction with a hydrocarbon.

Since the novel treating agents are attached to the substratum in the form of a thin, presumably monomolecular layer, the treatment has no noticeable effect on the appearance or feel of the material treated. However, the material is made essentially impervious to water. Once the adduct has been properly reacted with the fibers, its effect is essentially permanent since it is not washed out either by laundering or dry cleaning.

For a better understanding, the invention will now be illustrated by actual working examples. Unless otherwise indicated, all proportions of materials are expressed on a weight basis.

EXAMPLE 1

A solution of 159.8 g. (0.915 mole) of freshly distilled 2,4-tolylene diisocyanate (B.P. 122°–145° C. at 15 mm.) was made in 75 cc. of dry hexane. This solution was placed in a glass reaction flask equipped with a dropping funnel and a stirrer. Another solution of 72.6 g. (0.3 mole) of $C_{17}$ alkoxyl alcohol ($C_8H_{17}O.C_9H_{18}OH$ from $C_8$ Oxo bottoms) was made in 75 cc. of dry hexane.

The second solution was added to the first in increments over a period of 105 minutes with stirring. During this time the temperature of the reaction mixture had risen from 24.5° C. to 45.5° C. The mixture was then refluxed for ½ hr. to complete the reaction.

A stillhead was attached to the reaction vessel and the distillable material removed. The product boiling above hexane was taken as three cuts.

(A)   101.0 g. B.P. 130° C. (15 mm.)–95.0° C. (1.0 mm.)
(B)   29.5 g. B.P. 102° C. (1.0 mm.)–165° C. (1.0 mm.)
(C)   109.0 g. non-volatile product (viscous oil)
Total recovery  239.5 g.=98.5%

The non-volatile product is the alcohol-diisocyanate adduct and amounts to 90.5% of theoretical yield. In attempting to distill this product the excessively high pot temperature of 237° C. was reached. It was observed that some decomposition to volatile products (presumably reversal of the reaction) occurred. In the absence of such drastic treatment even higher yields of the adduct can be isolated.

EXAMPLE 2

Sizing agents were removed from a piece of white Indian head cotton by alternate washing with aqueous soap solution and extraction with a light naphtha hydrocarbon solvent. A sample of the resulting cloth weighing 6.8 g. was treated with a refluxing solution of 1.5 g. of the adduct of Example 1 in 150 cc. of heptane for 2.5 hours. The cloth was then squeezed and washed in fresh n-heptane twice; then refluxed in fresh heptane for 5 minutes to remove any unreacted adduct. After drying in an oven at 140° F. and standing in the air to equilibrate with atmospheric moisture, the sample actually weighed less than the original untreated cloth. This loss in weight is due to the fact that the treated cloth is quite hydrophobic and consequently takes up much less moisture than the untreated cloth. The appearance of the sample was not altered but the cloth was now quite waterproof. Tensile tests, summarized below, showed that the strength of the cloth had not been impaired.

[Strengths of ½" strips of cloth (cut perpendicular to selvage) run on a Scott tester]

|  | Untreated Cloth, lbs.½" Strip | Treated Cloth, lbs.½" Strip |
|---|---|---|
| #1 | 38.0 | 43.0 |
| #2 | 41.5 | 39.0 |
| #3 | 42.0 | 41.5 |
| Average | 40.5 | 41.2 |

EXAMPLE 3

An absorbent paper towel was saturated with a 1% solution of the adduct of Example 1 in n-heptane. The towel was then dried in an oven at 140° F. for ½ hour. It was then found to be impervious to a stream of water from a faucet.

EXAMPLE 4

In this case the hexane solvent was dried by distillation of a portion thereof and discarding. Likewise the apparatus was dried by distillation of hexane.

158.8 g. (.91 mole) of freshly distilled commercial tolylene diisocyanate (B.P. 93°–119° C. at 3 mm.) was placed in a 500 cc. 3-neck flask equipped with a stirrer. To this mixture was added dropwise with stirring over a period of 43 minutes a solution of 60 g. (0.30 mole) of a tridecanol ($C_{13}$ Oxo alcohol) in 75 cc. of n-hexane. During this period the pot temperature had risen spontaneously from 22.5° C. to 45.0° C. The mixture was then refluxed for 105 minutes to complete reaction.

A stillhead was attached to the reaction vessel and, after removal of the hexane, the product separated into two fractions: (A) the recovered excess diisocyanate and (B) the non-volatile adduct.

(A) 107.6 g.  B.P. 84° C. (1.4 mm.)–122° C. (0.3 mm.) (non-volatile at pot temp. 195° C. at 0.3 mm.)
(B) 111.0 g.
218.6 g.  (recovery=99.9%)
Yield of (B)=99% of theory.
(Viscous oil)

EXAMPLE 5

8.3 g. of the adduct prepared in Example 4 was dissolved in sufficient n-heptane to make 1 liter of solution. A piece of dry white Indianhead cotton from which the sizing agents had been removed as described before, and which weighed 10.754 g., was saturated with 14 cc. of this solution. The amount of adduct thus available to react with the cloth was 0.116 g. of 1.08 wt. percent on cloth. The cloth was baked in an oven at 200° F. for 2 hrs. It was then extracted twice with normal heptane to remove any unreacted adduct and dried in the oven for 20 minutes. After coming to equilibrium with atmospheric moisture the piece of cloth weighed 10.783 g., a gain of 0.29 wt. percent. The cloth was unchanged in appearance but was quite waterproof: when cupped so as to form a bag and filled with tap water no penetration of water occurred. The strength of the cloth was not adversely affected by this treatment as shown below.

[Pounds of breaking strength of ½" wide strips of cloth determined on Scott tester]

|  | Untreated cloth | Treated cloth |
|---|---|---|
| Parallel to selvage | 39.0 | 46.0 |
|  | 47.0 | 50.5 |
|  | 53.5 |  |
| Ave | 46.5 | 48.3 |
| Perpendicular to selvage | 36.2 | 42.0 |
|  | 40.0 | 41.2 |
|  | 43.0 | 47.0 |
|  | 40.8 | 39.0 |
|  | 46.5 | 40.0 |
| Ave | 41.3 | 41.8 |

EXAMPLE 6

A solution of the adduct prepared in Example 4 was made in heptane so as to contain 2.1 mg. of adduct per cc. of solution. A double sheet of newspaper weighing 25.5 g. was saturated with 40 cc. of this solution. Thus 84 mg. or 0.33 wt. percent of adduct was made available for reaction with the paper. The paper was baked in an oven at 200° F. for 10 minutes. There was no change in appearance.

This treatment imparted a considerable degree of water resistance. When held folded under a fast running faucet the water did not soak through the top sheet and this sheet was essentially dry in 10 minutes' exposure to air. A similar treatment of a piece of untreated paper caused soaking through 3 sheets which were not dry even in an hour.

EXAMPLE 7

*Formation of adduct of tolylene diisocyanate with hydroxy-methylated butyl rubber.*—Butyl rubber (Enjay grade 325) containing 2% of combined isoprene was hydroxy-methylated by the Prins reaction so as to contain about 0.4 wt. percent hydroxyl groups as determined by the infrared spectrum. The hydroxymethylation was carried out as follows:

100 gm. of the butyl rubber dissolved in 850 cc. chloroform was charged to a 3-neck flask fitted with a stirrer and a dropping funnel. A complex, made by heating 5.3 gm. of boron trifluoride etherate, 3.2 gm. paraformaldehyde and 50 cc. chloroform, was added with stirring under nitrogen. The total mixture was stirred at room temperature for 7 hrs. under nitrogen and allowed to stand overnight. The resulting modified butyl rubber was precipitated with acetone and redissolved in hexane. The hexane solution of modified rubber was then washed with 5% aqueous sodium hydroxide solution, then with water until neutral to litmus, and the rubber precipitated with acetone. The modified rubber was finally dried for 22 hrs. at 60° C. and 20 inches vacuum. In appearance it was indistinguishable from the initial unmodified polymer. As a test, five drops of tolylene diisocyanate were added to a solution of 2 gms. of the modified rubber in hexane. The mixture gelled overnight indicating the presence of hydroxyl groups. Infrared analysis indicated 0.4 wt. percent hydroxyl on the rubber.

To a three-neck flask fitted with a dropping funnel and a stirrer was charged 101.9 g. of 20 wt. percent hydroxy-methylated butyl rubber in hexane. To this was added 1.5 g. (.0086 mole) of a commercial mixture of tolylene diisocyanate isomers in 15 cc. of hexane. The resulting mixture was stirred for 1 hour under nitrogen. Then 0.5 g. (0.002 mole) of a hexadecanol ($C_{16}$ Oxo alcohol) in 15 cc. of hexane was added and the mixture stirred under nitrogen for 1 hour to react with excess diisocyanate. The final concentration of butyl adduct was 18.3 wt. percent.

EXAMPLE 8

A sample of white Indian head cotton, with sizing removed, was refluxed for two hours in a hexane solution of the butyl rubber adduct described in Example 7. The cloth was then exhaustively extracted 5 times with hexane to remove any rubber that was not chemically bound to the cloth, then dried 1 hour in an oven at 180° F. The weight of cloth before treatment was 6.908 g. and after treatment 7.163 g. The amount of rubber chemically attached was 3.7 wt. percent. The treated cloth had the same strength as untreated cloth as determined on a Scott tester. The cloth was not penetrated by water standing on the cloth for six days.

A similar piece of cloth was treated under the same conditions with a solution of unmodified "Enjay 325" butyl rubber in hexane. After extraction with hexane the gain in weight was 0.3% and the sample was not waterproof.

EXAMPLE 9

A. A solution of 65.5 gm. (0.376 mole) of freshly distilled tolylene diisocyanate in 75 cc. sodium-dried hexane was charged to a 3-neck flask fitted with a stirrer, a dropping funnel and a reflux condenser. A solution of 72.6 gm. (0.3 mole) of a $C_{16}$ monohydric Aldox alcohol ($C_{16}H_{33}OH$) in 75 cc. dry hexane was added to this with stirring under nitrogen. Addition required 35 minutes during which interval the temperature rose from 21° C. to 49° C. The mixture was then refluxed 40 minutes. The hexane was stripped out and the excess tolylene diisocyanate was distilled at 1.1 mm. pressure until the pot temperature reached 195° C. The yield of non-volatile product was 124.1 gm., which corresponds to a yield of 97.3% of the monoadduct and 2.7% of the diadduct.

B. Similar preparations were made but with different molar ratios of tolylene diisocyanate (TDIC) to alcohol. The corresponding yields of monoadduct are summarized in Table I.

*Table I*
EFFECT OF REAGENT PROPORTIONS ON MONOADDUCT YIELD

| TDIC/alcohol, mole ratio: | Monoadduct yield, wt. percent (on alcohol) |
|---|---|
| 1.0 | 62 |
| 1.05 | 79 |
| 1.15 | 89.5 |
| 1.2 | 91.5 |
| 1.25 | 97.5 |
| 1.5 | 99.5 |

From the above data it is apparent that at TDIC/alcohol mole ratios of at least 1.2, better than 90% yields of the desired isocyanourethane monoadduct are obtained, whereas at lower ratios the formation of the unwanted diadduct (diurethane) increases rather abruptly. The diurethane, of course, is incapable of reacting with cotton fibers or the like. For this reason it is most desirable to carry out the reaction at diisocyanate/alcohol mole ratios between about 1.2 and 2, preferably between 1.25 and 1.5 in which range virtually perfect selectively to the monoadduct is attained. However, the preferred ratio may vary somewhat depending on the specific reagents employed.

Wool suiting is rendered waterproof when impregnated with a hexane solution containing 0.5% of the product of Example 9A (in an amount providing 1.6 weight percent available for reaction per weight of fabric) and baked in an oven for 90 minutes at 80° C. The treated cloth is not wet or penetrated by water.

EXAMPLE 10

To a solution of 65.3 g. (0.375 mole) of tolylene diisocyanate in 75 cc. of dry hexane was added over a period of 40 minutes a solution of 93.6 g. (0.329 mole) of a $C_{21}$ alkoxy alcohol ($C_{21}OH_{43}$—OH). The temperature of the reaction mixture rose spontaneously from 25° C. to 42° C. over the course of the addition. The mixture was refluxed 1.5 hours to complete the reaction and the hexane then removed by distillation. A volatile cut amounting to 11.9 g. (B.P. 87°–116° C. at 1.1–1.9 mm.) was then removed by distilling to a pot temperature of 183° C. A non-volatile residue of 142.2 g. remained. This corresponds to a yield of 96.3% of theory of the alcohol-diisocyanate monoadduct and 3.7% of the diadduct.

Nylon cloth is made waterproof when treated with a dilute heptane solution of the above adduct to make 0.8 weight percent of the adduct (based on cloth weight) available for reaction, followed by baking for 1 hour at 70° C.

The adducts of Examples 4, 9 and 10, all of which were viscous oils, have been found to have the characteristics summarized in Table II.

*Table II*

MONOADDUCTS OF THE INDICATED ALCOHOLS WITH TOLYLENE DIISOCYANATE

| Example | 4 | 9 | 10 |
|---|---|---|---|
| Alcohol Reagent | $C_{13}$ Oxo Alcohol. | $C_{16}$ Aldox Alcohol. | $C_{21}$ Alkoxy Alcohol from $C_{10}$ Oxo bottoms. |
| $d_4^{25}$ | 1.0261 | 1.0079 | 0.9868 |
| $n_D^{25}$ | 1.5163 | 1.5120 | 1.5015 |
| Percent Carbon: | | | |
| Found | 70.20, 70.97 | 72.48 | 71.68 |
| Theory | 70.55 | 72.08 | 71.67 |
| Percent Hydrogen: | | | |
| Found | 9.08, 9.41 | 9.98 | 9.88 |
| Theory | 9.16 | 9.67 | 10.03 |

Of course, the foregoing examples have been given for illustrative purposes only. The ultimate scope of the invention is particularly pointed out in the appended claims, especially when read with reference to the foregoing specification and the prior art.

The claimed invention is:

1. A stable isocyanourethan monoadduct compound of the formula:

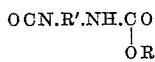

wherein R' is a divalent aromatic hydrocarbon radical containing 6 to 8 carbon atoms with the isocyanate groups in the meta position and R is a hydrophobic aliphatic radical of at least 10 carbon atoms selected from the group consisting of a radical having the structure —Z—O—Y, wherein Z is an alkylene radical and Y is an alkyl radical with each of said radicals containing 5 to 15 carbon atoms, a butyl rubber copolymer of a $C_4$ to $C_7$ isoolefin and a $C_4$ to $C_8$ conjugated diolefin, a petroleum resin having a molecular weight of about 1000, polypropylene which has been polymerized in the presence of a Friedel-Crafts catalyst, and rubber copolymer of styrene and diolefin.

2. A stable isocyanourethan monoadduct compound of the formula:

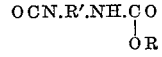

wherein R' is a divalent hydrocarbon radical of 6 to 12 carbon atoms and R is a hydrophobic aliphatic radical of at least 10 carbon atoms selected from the group consisting of a radical having the structure —Z—O—Y, wherein Z is an alkylene radical and Y is an alkyl radical with each of said radicals containing 5 to 15 carbon atoms, a butyl rubber copolymer of a $C_4$ to $C_7$ isoolefin and a $C_4$ to $C_8$ conjugated diolefin, a petroleum resin having a molecular weight of about 1000, polypropylene which has been polymerized in the presence of a Friedel-Crafts catalyst, and rubber copolymer of styrene and diolefin.

3. A process for making a stable monoisocyano monoadduct compound which comprises mixing 1.2 to 2 moles of a diisocyanate of the formula:

wherein R' is a divalent hydrocarbon radical of 6 to 12 carbon atoms with 1 mole of a hydroxymethylated polymer selected from the group consisting of butyl rubber copolymer of a $C_4$ to $C_7$ isoolefin and a $C_4$ to $C_8$ conjugated diolefin, a petroleum resin having a molecular weight of about 1000, polypropylene which was polymerized in the presence of a Friedel-Crafts catalyst, and a rubbery copolymer of styrene and diolefin; and maintaining the mixture at a temperature of about 0 to 100° C. until at least 90 mole percent of the hydroxycompound is converted into a monoisocyanate adduct.

4. A compound according to claim 2 wherein R' is 2,4-tolylene.

5. A compound according to claim 2 wherein R' is 1,6-hexamethylene.

6. A compound according to claim 2 wherein R is a radical having the structure —Z—O—Y, wherein Z is an alkylene radical and Y is an alkyl radical with each of said radicals containing 5 to 15 carbon atoms.

7. A process according to claim 3 wherein the diisocyanate is 2,4-tolylene diisocyanate.

8. A compound according to claim 1 wherein R' is 2,4-tolylene diisocyanate.

References Cited in the file of this patent

UNITED STATES PATENTS

| | | |
|---|---|---|
| 2,284,637 | Catlin | June 2, 1942 |
| 2,439,514 | Herndon | Apr. 13, 1948 |
| 2,729,666 | Stallmann | Jan. 3, 1956 |
| 2,757,185 | Barthel | July 31, 1956 |
| 2,764,592 | Seeger et al. | Sept. 25, 1956 |
| 2,781,242 | Knapp | Feb. 12, 1957 |
| 2,782,089 | Rakowski et al. | Feb. 19, 1957 |
| 2,863,856 | Hetzel | Dec. 9, 1958 |
| 2,952,665 | Bunge et al. | Sept. 13, 1960 |

FOREIGN PATENTS

| | | |
|---|---|---|
| 773,897 | Great Britain | May 1, 1957 |

OTHER REFERENCES

American Chemical Society, Abstracts of Papers, The 130th Meeting (1956), page 13–P.